Aug. 12, 1969   R. E. SANCTUARY   3,460,799

VARIABLE TORQUE VALVE ACTUATOR

Filed Aug. 25, 1967

INVENTOR
Robert E. Sanctuary

BY *Hall, Pollock & VandeSande*

ATTORNEYS

United States Patent Office 3,460,799
Patented Aug. 12, 1969

3,460,799
VARIABLE TORQUE VALVE ACTUATOR
Robert E. Sanctuary, 38 Saturn Drive,
Shrewsbury, Mass. 01545
Continuation-in-part of application Ser. No. 404,225,
Oct. 16, 1964. This application Aug. 25, 1967, Ser.
No. 663,412
Int. Cl. F16k *31/42, 31/52;* F15b *15/06*
U.S. Cl. 251—30                                8 Claims

ABSTRACT OF THE DISCLOSURE

A rotatable member connected to a valve stem is provided with two spaced force receiving surfaces. An elongated reciprocable member carries two pusher elements in respective engagement with the two force receiving surfaces for moving the rotatable member, and thereby the valve stem, through a predetermined arc of rotation in two opposing directions when the reciprocable member is reciprocated by a fluid pressure motor attached thereto. The spaced force receiving surfaces are contoured to provide a torque-force curve which is asymmetrical with respect to the center-line of the predetermined arc of rotation in both directions of rotation, the force-torque curve in each direction of rotation being characterized by a relatively high initial torque which drops rapidly to a lesser value, and which provides a finishing torque less than the initial torque.

CROSS-REFERENCE TO RELATED APPLICATION

The present application comprises a continuation-in-part of my prior copending application Ser. No. 404,225, filed Oct. 16, 1964, and now abandoned, for "Actuator."

BACKGROUND OF THE INVENTION

This invention relates to an actuator and, more particularly, to apparatus arranged to operate a valve or the like in a predetermined manner.

It is often necessary in industrial applications to provide for the remote operation of a valve. For this purpose, a number of actuators have been provided which operate under the impetus of electrical, pneumatic, or hydraulic fluid, the operation being controlled by switches, valves, and the like, as is well known in the art. For many of these valves, especially in the case of the so-called "ball" valve, it is necessary to provide an extremely high "breakaway" torque on the valve stem to begin movement of the valve from its "closed" to "open" position, and sometimes from the "open" to "closed" position. After such "breakaway," the torque required to continue movement of the valve may be substantially reduced. Nevertheless, because of the extremely high torque variations throughout the cycle of operating the valve, the motor portion of the actuator must be selected commensurate with the highest torque requirement. This means that, if the operating fluid is pressurized air, an extremely high pressure air system must be provided even though the extremely high breakaway torque is not required during most of the operating cycle.

In addition, it has always been difficult to match the operating characteristics of the actuator to the desired opening and closing torque characteristics of the valve. For instance, when the actuator motor comprises a piston and cylinder the piston normally moves in a straight line relationship. When the end of the piston is connected to the valve stem through a lever, the end of the lever which is pivotally connected to the piston moves through an arcuate path, and the torque imposed on the valve stem (connected to the other end of said lever) has a sinusoidal characteristic, with a maximum torque occurring at some point between the open and closed positions of the valve, normally about midway in the stroke, and the starting and finishing torques normally both being lower than said maximum torque. When the piston is connected to the valve stem by a rack-and-pinion arrangement, the result is an almost perfect straight line torque relationship. Another method that has been used to connect the actuator motor to the valve stem is by the use of a pin on the piston rod sliding in a slot in a lever attached to the valve stem. This also gives a somewhat sinusoidal torque characteristic, but with a minimum torque occurring at some point between the open and closed positions of the valve, normally about midway in the stroke, and with the starting and finishing torques normally both being higher than said minimum torque.

None of these prior torque characteristics lend themselves to meeting the torque requirements of the particular valve being operated in the present invention. More particularly, the actuator of the present invention is intended for use with valves, such as ball valves, which require a relatively high opening break-away torque, dropping rapidly to a lower torque for the rest of the operating stroke.

SUMMARY OF THE INVENTION

The actuator of the present invention is adapted to achieve a particular torque-force curve which approaches the optimum for any particular valve with which that actuator is to be used. The actuator operates to move the valve stem through a limited arc of rotation which has a beginning and an end; and the valve stem can be moved in either of two opposing directions through this arc of movement. The torque-force curve provided by the actuator, as the valve stem is moved from one end to the other end of this arc of rotation in either direction of rotation is characterized by an asymmetrical curve with respect to the center line of rotation. Thus, when the valve stem is moved from one end of the arc of rotation to the other end, the torque provided at the beginning of this movement is not the same as the torque which is provided at the end of the movement; and in most cases, the torque at the beginning of the movement will be substantially higher than the torque at the end of the movement.

Moreover, the actuator of the present invention is so arranged that the torque-force curves for opposite directions of valve motion do not retrace themselves as the valve stem is reciprocated between the opposite ends of its arc of rotation. Thus, when the valve stem is moved through its arc of rotation in one direction, the finishing torque is significantly different from the torque which is then initially exerted on the valve steam when the actuator starts movement of the valve stem in the reverse direction.

The foregoing characteristics are achieved by providing an actuator which includes a pair of contoured force receiving surfaces which are respectively associated with a pair of pusher elements. One pusher element cooperates with one only of the force receiving surfaces to effect motion of the actuator in one direction only; and the two pusher elements, cooperating with the two contoured force receiving surfaces, then achieve the desired torque-force characteristics in both directions of motion. Due to the fact that two contoured surfaces are provided which are effective respectively during different directions of motion, the two force receiving surfaces can have different contours so that the torque-force characteristic for motion in one direction is significantly different from the torque-force characteristic for motion in the opposite direction, if this is required by a particular valve in which the actuator is to be employed.

When used in conjunction with a ball valve, the surface contours are so chosen that a high initial break-away torque is provided to facilitate opening of the valve. This high initial torque is desirable to overcome restraints imposed by fluid pressures within the valve, and by binding forces which are normally exerted between the ball of the valve and its associated seat surfaces. Once the high initial torque has accomplished its purpose in commencing rotation of the valve ball, the actuator operates to automatically cause the torque to drop to a much lower value consistent with the torque required to continue rotation of the valve ball from its closed or its open position (or vice versa).

It is accordingly a primary object of the invention to provide an actuator whose output torque is a predetermined mathematical function of the force exerted by the operating motor.

A further object of the present invention is the provision of a valve actuator which is simple in construction, which may be readily manufactured from easily obtained materials, which is inexpensive to manufacture, and which is capable of a long life of useful service with a minimum of maintenance.

It is another object of the instant invention to provide a valve actuator in which the operating fluid is required in relatively smaller amounts than is normally required by prior valve actuators.

It is a further object of the invention to provide a valve actuator for operating a ball valve wherein the actuator consists of relatively few simply constructed parts and in which is provided a simple connection between the actuator motor and the valve stem to produce an accurately predetermined relative motion of the valve stem upon motion of the actuator motor, which connecting means is easily adjusted to fit a particular valve.

A still further object of this invention is the provision of a ball valve actuator in which a high opening torque is obtainable using a relatively small operating motor.

DESCRIPTION OF THE PREFERRED EMBODIMENTS

Figure 1:
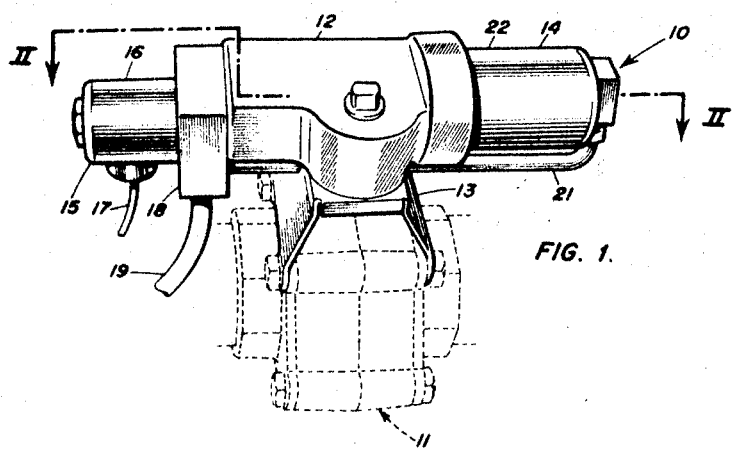
FIG. 1 is a perspective view of an actuator embodying the principles of the present invention.

Referring first to FIG 1, wherein are best shown the general features of the invention, the actuator, indicated generally by the reference numeral 10, is shown in use with a ball valve 11 of the well-known type. The actuator consists of an elongated housing 12 to the bottom surface of which is attached a bracket 13 adapted to be bolted to the housing of the valve 11. At one end of the housing 12 is a pneumatic motor 14 and at the other end a solenoid valve 15 having a solenoid element 16 controlled from an electrical connection 17 and having a valve element 18 provided with a conduit 19 leading to a source of fluid pressure (not shown). Valve element 18, which is moved by solenoid element 16, is constructed to operate in the manner of a standard four way valve, and may comprise an arrangement of the type shown, for example, in FIGURE 4 of Matheson et al. U.S. Patent No. 3,056,573.

Figure 2:
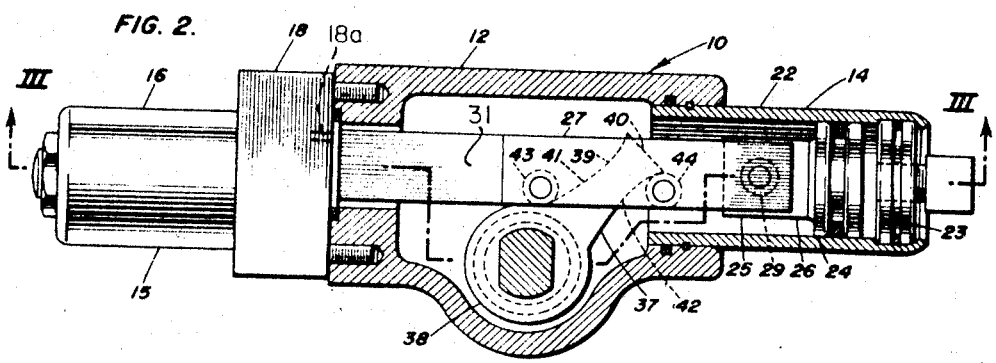
FIG. 2 is a sectional view of the actuator taken on the line II—II of FIG. 1.
Figure 3:
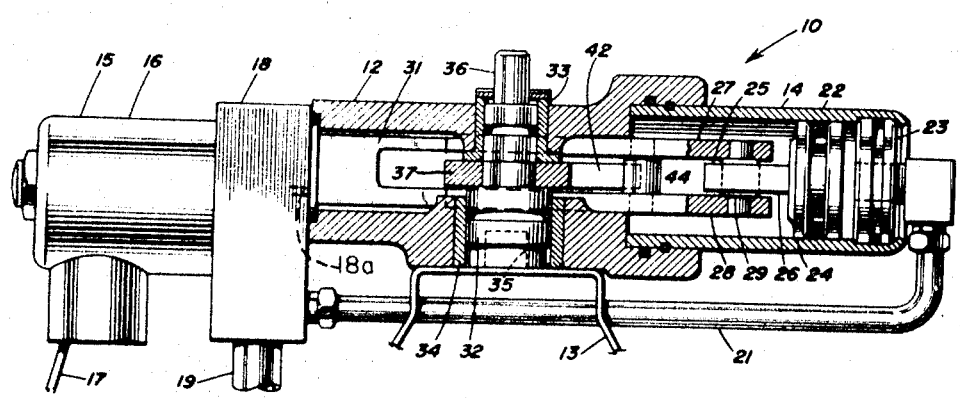
FIG. 3 is a vertical sectional view of the invention taken on the line III—III of FIG. 2.

FIGS. 2 and 3 show the details of the invention. One cylinder connection from valve 18 is made by a conduit 21 to the outer end of the motor 14. The other cylinder connection from valve 18 is made directly to the interior of housing 12 (and thereby to the inner end of motor 14) by means of an orifice, located at 18a, on the face of valve element 18 which is fastened and sealed against the end of housing 12 as illustrated. The motor 14 is made up of cylinder 22 having a head 23 at its outer end into which the conduit 21 is connected. Slidable in the cylinder is a piston 24 having a piston rod 25. The piston rod consists of an inner portion 26 fixed to the center of the piston 24 and an outer portion consisting of two spaced parallel plates 27 and 28 which are pivotally connected to the inner portion 26 by a pin 29. The interior of housing 12 is provided with a broached slot which runs the length of said housing 12, and which provides bearing surfaces 31 on which the plates 27–28 can slide back and forth as they are reciprocated by piston 24. Also mounted in the housing 12 is a coupling element 32 mounted in suitable sleeve bearings 33 and 34 in the housing. At its lower end the coupling element 32 is provided with a socket 35 adapted to be connected to the stem of the ball valve 11. At its upper end, element 32 extends out of the housing 12 and is provided with a neck 36 having a noncircular configuration to permit the application of a wrench or the like for emergency operation. The central portion of the coupling element 32 is also noncircular, as is evident in FIG. 2, and on this portion is mounted a flat connecting member 37. The connecting member is provided with a generally circular main body portion 38 from which extends a radial arm 39. This arm extends between the two plates 27 and 28 of the piston rod 25. The arm 39 is elongated and has a generally tangential or square end 40, a formed side 41, and an opposite formed side 42. These sides are formed to a mathematical curve commensurate with the predetermined torque a which the valve 11 is to be operated. The curvatures of sides 41 and 42 are such, as best illustrated in FIGURE 2, that the radial arm 39 is of "fishtail" configuration, i.e., the two sides flare outwardly to produce an intermediate arm region which is narrower than the outermost end of said arm. Extending from the plate 27 to the plate 28 are two parallel spaced pins 43 and 44 which lie adjacent the sides 41 and 42, respectively.

The operation of the invention will now be readily understood in view of the above description. Let us suppose that the valve 11 is in its closed position and the elements occupy the position shown in FIG. 2. When it is desired to open the valve, an electrical current is passed through the electrical connection 17 into the solenoid element 16. This will open the valve element 18 and permit fluid pressure to pass from the conduit 19 through the valve element 18, through the conduit 21 into the outer end of the motor 14. During this operation, the interior connections in valve 18 are such that fluid pressures within housing 12, at the inner end of motor 14, are exhausted through orifice 18a. The resultant fluid pressure difference across piston 24 will move piston 24 to the left carrying the piston rod 25 with it. The pin 44 will push against the formed side 42 of the arm 39 of the connecting member 37. The force of the pin 44 on the arm 39 will cause arm 39 to rotate about its axis of the main body portion 38 which, in turn, is keyed by means of the socket 35 to the stem of the valve 11 and will rotate the ball element of the valve, moving it toward its open position. At any given time, of course, the horizontal component of force in the piston rod will be transmitted through the point of contact of the pin 44 with the formed side 42 of the connecting member 37. This component of force will be broken down into a usable component normal to the curve of the formed side 42 and a component extending transversely to the plates 27–28. At the beginning of the opening of the valve, it is not necessary that motion take place particularly rapidly, but it is important that considerable torque be applied to the valve, since there are certain difficulties in opening a ball valve such as 11 against the pressure of the fluid in said ball valve. The effect of having the curve of the formed side 42 flare out considerably, as is obvious in the drawing in FIG. 2, is that the energy available in the piston will go to producing high torque forces on the arm, rather than large rotative motion. On the other hand, as the piston continues in its stroke, pin 44 encounters a portion of the formed side 42 which is generally parallel to the length of the arm 39. When this happens, the rotation motion will be larger but the resultant output torque will be considerably reduced; and, as the stroke continues and the valve approaches its entirely open position, there will be a slight increase in output torque to provide a final torque slightly higher than the aforementioned reduced output torque, but considerably less than the initial breakaway torque.

The return stroke of the actuator, to move valve 11 from its open to its closed position, is effected by removing the electrical signal from solenoid element 16. This reverses the fluid pressure connections within valve 18, so that the high pressure fluid from conduit 19 is applied via valve 18 and orifice 18a to the interior of housing 12 and thus to the inner end of motor 14; while fluid pressure at the outer end of motor 14 is exhausted via conduit 21 through valve 18. The resultant pressure difference across piston 24 is accordingly reversed, causing piston 24 and plates 27–28 to move to the right. During this return movement, pin 43 pushes against the formed side 41 of arm 39 to produce a torque-force curve having a characteristic dependent upon the form of side 41; and the return stroke torque-force curve is normally the same as that already described for the valve opening motion, i.e., a high initial torque (higher than the final torque of the forward stroke), dropping rapidly to the reduced torque value described previously, and then, possibly, increasing slightly as the valve 11 approaches its fully closed position. It should be noted that the torque-force curve during the return stroke is not simply a retrace of the torque-force curve during the forward stroke, i.e., the final torque upon completion of the forward stroke is considerably less than the initial torque upon commencement of the return stroke, and vice versa. Moreover, the curvatures of sides 42 and 41 can be significantly different from one another, to provide completely different torque-force curves for the forward and return strokes respectively. The form which the side 42, or 41, takes can be calculated mathematically or determined experimentally in such a way as to give the exact torque curves required for optimum operation of the valve. Because of the efficient use of fluid energy, the size of the motor 14, as well as the size of the solenoid element 16 and the valve element 18, can be kept relatively small. If there is fluid power failure, the operator may move the valve by putting a wrench on the neck 36 of the connection member 37 to rotate it and the ball of the valve in a desired manner.

I claim:

1. A valve actuator for connecting a valve stem to a source of power and operative to introduce a variation in the ratio between the torque available to turn the valve and the force available from the source of power, comprising a rotatable member, means for connecting said rotatable member adjacent its axis of rotation to the valve stem, said rotatable member comprising means providing spaced force receiving surfaces, an elongated reciprocable member movable between two limit positions, said reciprocable member having two spaced pusher elements in respective engagement with said two force receiving surfaces for moving said rotatable member, and thereby the valve stem, through a predetermined arc of rotation in two opposing directions when said reciprocable member is reciprocated between its limit positions, one of said pusher elements acting on one of said surfaces when said reciprocable members is moving in one direction, and the other pusher element acting on the other surface when said reciprocable member is moving in the other direction, said spaced force receiving surfaces diverging from one another along said rotatable member away from said axis of rotation to provide an asymmetrical torque-force curve having a high starting torque dropping rapidly to a lesser operating torque and terminating in a finishing torque substantially less than said starting torque, the torque force curves provided by said two surfaces being asymmetrical in both directions of rotation with the finishing torque provided when the rotatable member is moved from one end to the other end of the arc of rotation in either direction of rotation by a force exerted by one of the pusher elements on one of the surfaces being different from the starting torque subsequently provided when the other pusher element exerts a force on the other surface in moving the rotatable member away from that other end of the arc of rotation back toward the one end of the arc of rotation.

2. The actuator as claimed in claim 1 in which said two limit positions are so located that each pusher element starts its pushing stroke at a point remote from the center-line of said predetermined arc of rotation and, during its pushing stroke, moves toward the center-line of the predetermined arc of rotation to finish its pushing stroke at a point near said center-line.

3. The actuator as claimed in claim 1 wherein said means providing said spaced surfaces comprises an elongated lever arm which varies in width between its opposite ends to provide said force receiving surfaces along the opposing variably spaced edges of the lever arm.

4. The actuator of claim 3 wherein said varying width lever arm has one of its ends connected to a socket adapted to be connected to the valve stem, the other end of said lever arm being a free end, said lever arm being wider at its free end than it is at a location between said free end and said socket.

5. An actuator for a ball valve having an operating stem, comprising a housing adapted to be mounted on the valve, an elongated rod mounted for reciprocation in said housing, two pins extending transversely from said rod at longitudinally spaced locations, a coupling member extending parallel to and spaced from the pins and being adapted to be coupled to the operating stem of the valve, and an elongated connecting member attached to the coupling member and extending between said pins in a direction substantially radial to said operating stem, said connecting member having two opposed mathematically formed surfaces, said surfaces diverging from one another along said connecting member whereby said connecting member has an outermost free end which is wider than portions of said connecting member between said free end and said coupling member, each surface engaging one of the pins to operate the valve in a predetermined manner.

6. An actuator as recited in claim 5, wherein at least a portion of said rod consists of two parallel spaced plates with said pins extending between them and wherein the connecting member has two flat parallel surfaces extending between the mathematically formed surfaces and lying between the said plates.

7. An actuator for a ball valve having an operating stem, comprising a coupling member for attachment to said operating stem, an elongated connecting member attached at one of its ends to said coupling member and extending away from said coupling member in a generally radial direction relative to said operating stem, the other end of said connecting member being a free end spaced away from said coupling member, said connecting member having a fan-shaped portion defined by a pair of opposing edges which diverge from one another in such manner that said elongated connecting member has a width, at a region along said connecting member spaced from said coupling member, which is less than the width of said connecting member at the free end of said connecting member, a reciprocable operating member having a pair of spaced pins disposed in engagement respectively with said pair of opposing edges, and means for moving said reciprocable member along a straight line transverse to said connecting member to cause said pins to move alternatively along said edges between the opposing ends of said connecting member thereby to rotate said coupling member.

8. The actuator of claim 7 wherein the width of said connecting member at a position closely adjacent said coupling member is greater than the width of said connecting member at said spaced region, whereby said spaced region is narrower than either of the opposing ends of said connecting member.

References Cited

UNITED STATES PATENTS

| 2,712,242 | 7/1955 | Davis | 74—104 X |
| 2,953,344 | 9/1960 | Yanly. | |
| 2,954,754 | 10/1960 | Flick. | |
| 3,056,573 | 10/1962 | Matheson et al. | |
| 3,104,592 | 9/1963 | Sheesley. | |
| 3,253,518 | 5/1966 | Duemler | 74—104 X |
| 3,261,266 | 7/1966 | Ledeen et al. | |

ARNOLD ROSENTHAL, Primary Examiner

U.S. Cl. X.R.

74—104; 92—138; 251—58